(12) United States Patent
Mulargia et al.

(10) Patent No.: US 7,800,981 B2
(45) Date of Patent: Sep. 21, 2010

(54) HIGH EFFICIENCY PORTABLE SEISMOGRAPH FOR MEASURING SEISMIC TREMOR

(76) Inventors: Francesco Mulargia, Via Avesella, 3, Bologna (IT) I-40121; Silvia Castellaro, Via Aseggiano, 234, Venezia (IT) I-30030; Dario Albarello, Via Tibaldi, 20, Bologna (IT) I-40129; Marco Mucciarelli, Via Mazzini, Potenza (IT) I-85100

( * ) Notice: Subject to any disclaimer, the term of this patent is extended or adjusted under 35 U.S.C. 154(b) by 240 days.

(21) Appl. No.: 11/571,616

(22) PCT Filed: Jul. 18, 2005

(86) PCT No.: PCT/IB2005/002054
§ 371 (c)(1), (2), (4) Date: Jan. 4, 2007

(87) PCT Pub. No.: WO2006/011021
PCT Pub. Date: Feb. 2, 2006

(65) Prior Publication Data
US 2007/0230278 A1    Oct. 4, 2007

(30) Foreign Application Priority Data
Jul. 19, 2004   (IT)   ........................... BO2004A0449

(51) Int. Cl.
*H04R 19/00* (2006.01)
*H04R 17/00* (2006.01)
*G01V 1/18* (2006.01)

(52) U.S. Cl. .................. 367/181; 367/178; 367/157

(58) Field of Classification Search ............ 367/15, 367/20, 157, 178, 181
See application file for complete search history.

(56) References Cited

U.S. PATENT DOCUMENTS

| | | | |
|---|---|---|---|
| 1,744,379 A | | 8/1930 | Jones |
| 3,225,328 A | * | 12/1965 | LeCroart .................. 367/182 |
| 3,685,011 A | | 8/1972 | Lehner |
| 4,630,483 A | * | 12/1986 | Engdahl .................... 73/652 |
| 4,672,591 A | * | 6/1987 | Breimesser et al. ........ 367/152 |
| 5,022,052 A | * | 6/1991 | Stephens ................... 375/242 |
| 5,144,598 A | * | 9/1992 | Engdahl et al. ............ 367/181 |

(Continued)

FOREIGN PATENT DOCUMENTS

EP    0762146 A    3/1997

OTHER PUBLICATIONS

Kim, G.; Richardson, M. D.; Bibee, D. L.; Sawyer, W. B.; Vaughan, W. C., "Characterization of Sediment Properties in the Northeastern Gulf of Mexico Using the Acoustic Sediment Classifier System (ASCS)," American Geophysical Union, Fall Meeting 2002, abstract #OS61A-0206; http://adsabs.harvard.edu/abs/2002AGUFMOS61A0206K.*

(Continued)

*Primary Examiner*—Jack Keith
*Assistant Examiner*—Krystine Breier
(74) *Attorney, Agent, or Firm*—David A. Guerra

(57) ABSTRACT

Portable seismograph (1) comprising a support and containment structure (2), a bottom portion (3) of which is made of a material having a seismic impedance value ranging between $2 \times 10^5$ and $4 \times 10^6$ kg/m²s, three sensors (4) placed orthogonally to one another, each comprising at least one electrodynamic or capacitive transducer and, attached to the bottom portion (3), a level (11) to position the support and containment structure horizontally, a control unit (5) connected to the sensors (4) for viewing, managing the acquisition mode, recording and processing the data, a power source (9), and means for coupling to the ground (12; 21) designed not perturb the seismic tremor detectable by the sensors (4).

2 Claims, 1 Drawing Sheet

U.S. PATENT DOCUMENTS

| | | | |
|---|---|---|---|
| 5,553,035 A * | 9/1996 | Seyed-Bolorforosh et al. | 367/140 |
| 6,123,187 A * | 9/2000 | Bartels | 206/0.6 |
| 6,536,553 B1 * | 3/2003 | Scanlon | 181/108 |
| 6,714,484 B2 * | 3/2004 | Ladabaum et al. | 367/176 |
| 6,862,254 B2 * | 3/2005 | Ladabaum et al. | 367/176 |
| 2004/0179107 A1 * | 9/2004 | Benton | 348/211.99 |
| 2006/0137272 A1 * | 6/2006 | Kim | 52/411 |

OTHER PUBLICATIONS

Kim et al, "Charachterization of Sediment Properties in the Northeastern Gulf of Mexico Using the Acoustic Sediment Classifier System (ASCS)," American Geophysical Union, Fall Meeting 2002, abs #OS61A-0206.*

* cited by examiner

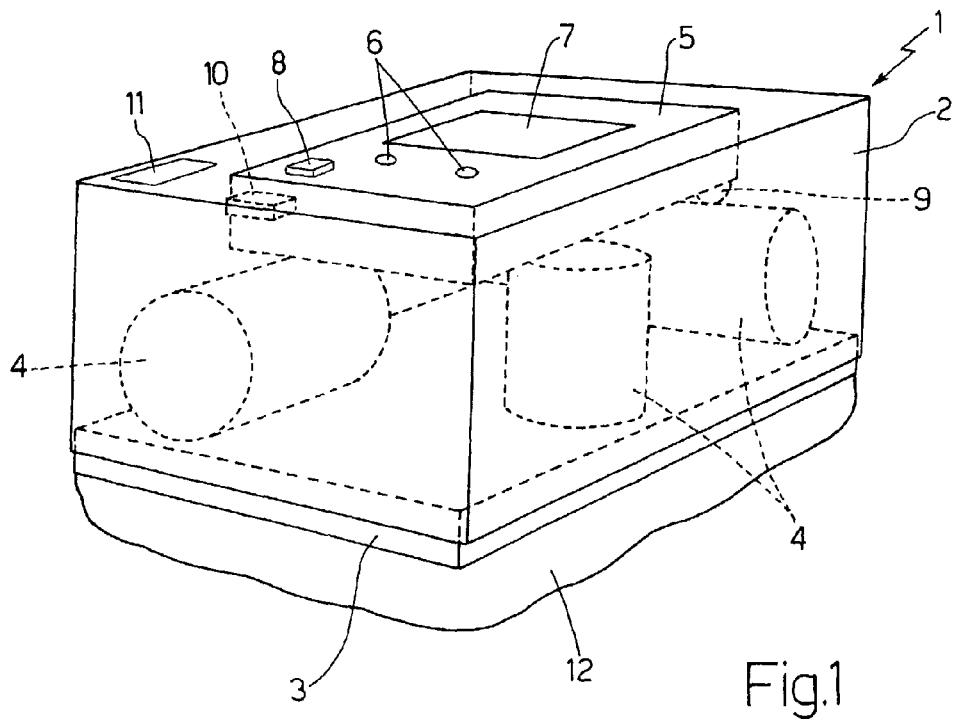
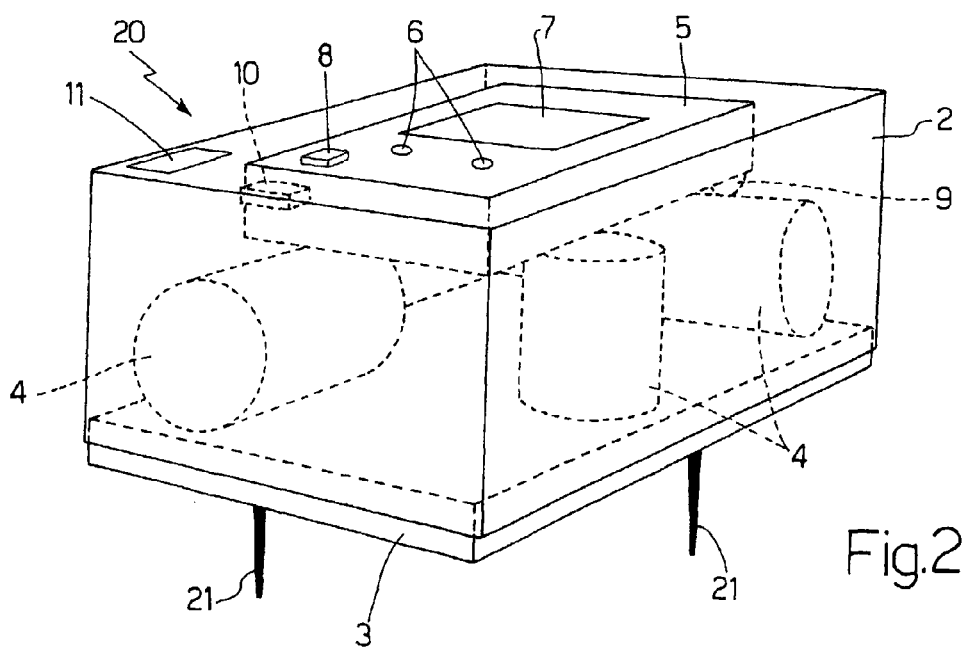

HIGH EFFICIENCY PORTABLE SEISMOGRAPH FOR MEASURING SEISMIC TREMOR

CROSS-REFERENCE TO RELATED APPLICATIONS

This application is an U.S. national phase application under 35 U.S.C. §371based upon co-pending International Application No. PCT/IB2005/002054 filed on Jul. 18, 2005. Additionally, this U.S. national phase application claims the benefit of priority of co-pending International Application No. PCT/IB2005/002054 filed on Jul. 18, 2005 and Italy Application No. BO2004A000449 filed on Jul. 19, 2004. The entire disclosures of the prior applications are incorporated herein by reference. The international application was published on Feb. 2, 2006 under Publication No. WO 2006/011021.

TECHNICAL FIELD

This invention relates to a high efficiency portable seismograph suitable for measuring seismic tremors, commonly denominated "tromograph" in the particular technical field to which it pertains.

BACKGROUND ART

In fields such as geotechnics and civil engineering, it has long been known the need to characterize the behaviour of structures through analysis of their oscillations, according to an engineering practice called "modal analysis".

Within this practice, the oscillations of structures are traditionally energized by suitable impulsive energy sources, typically impacts or small explosions.

However, it has been recently found that by using high sensitivity seismographs it is possible to avoid the use of any external source and to study the oscillations, entirely similar although very much smaller, induced by the seismic "tremor", that is by vibrations at frequencies from $10^{-4}$ to $10^2$ Hz which have occasionally an anthropic origin, but which have in general a natural origin (wind, waves, tides, vulcanic activity, etc.), and which are always present everywhere on the surface of the Earth.

Seismic tremor oscillations have a much smaller amplitude than the oscillations normally measured by standard seismographs and, in actual fact, in seismology the seismic tremor is considered as a "noise" that disturbs the "signal" of interest, which is composed of the waves emitted by earthquakes.

Since seismic tremor acts locally as an energizing function for the resonance frequencies of buildings and of the subsoil, recording and identifying these resonance frequencies makes it possible to measure in a completely passive, and therefore extremely economical, way the structural characteristics of buildings and of the ground beneath them.

Currently, such measurements are made by standard seismic instrumentation which, due to the fact that it has not been designed specifically for this purpose, is somewhat ineffective and prone to measurement errors. Moreover, such instrumentation is in general heavy, bulky, expensive and requires the intervention of more than one operator.

DISCLOSURE OF INVENTION

It is an object of the present invention to produce a seismograph with technical features capable of overcoming, in a simple and economic way, the problems of prior art.

An object of the present invention is a portable seismograph characterized by comprising a support and containment structure comprising at least a bottom portion made of material having a seismic impedance value within the range of $2 \times 10^5$ to $4 \times 10^6$ kg/m$^2$s, three sensors placed orthogonally to each other, each comprising at least one electrodynamic or capacitive transducer and fixed to said bottom portion, a level to position the containment structure horizontally, a control unit connected to said sensors and designed to record, to manage acquisition mode and to process data, an independent power source, and means for coupling to the ground designed not to perturb the seismic noise detectable by the sensors.

According to a preferred embodiment of the present invention the means for connection to the ground comprise nail or screw elements protruding from the bottom portion of the support and containment structure.

According to a further preferred embodiment of the present invention, the means for connection to the ground comprise a deformable layer made of a material in granular form or with rheological behaviour and having seismic impedance ranging between $2 \times 10^5$ and $4 \times 10^6$ kg/m$^2$s.

BRIEF DESCRIPTION OF THE DRAWINGS

The following example is illustrative only and does not intend to be limiting in any way and is provided for a better understanding of the invention together with the figures of the enclosed drawing, wherein:

FIG. 1 is a perspective view of a first embodiment of the portable seismograph according to the present invention; and FIG. 2 is a perspective view of a second embodiment of the portable seismograph according to the present invention.

BEST MODE FOR CARRYING OUT THE INVENTION

In FIG. 1 a preferred embodiment of the seismograph of the present invention is indicated as a whole with 1.

The seismograph 1 comprises a support and containment structure 2 comprising a bottom portion 3 made of a material having a seismic impedance value ranging between $2 \times 10^5$ and $4 \times 10^6$ kg/m$^2$s, and three sensors 4 placed orthogonally to one another and rigidly attached to the bottom portion 3. Each of the sensors 4 comprises an electrodynamic or capacitive transducer and is represented in phantom, as are all of the elements of the seismograph inside the structure 2.

The seismograph 1 comprises a control unit 5 for recording, acquiring and processing data coming from the sensors and comprising, in turn, a signal amplification and filtering system, a mass memory, external controls to adjust acquisition 6, a display 7 and a microprocessor (known and not illustrated) capable of directly processing the signal.

The seismograph 1 comprises, moreover, a device for external transmitting data externally 8, an energy source 9, a GPS receiver 10, and a level 11.

Finally, the seismograph 1 comprises a pad 12 for coupling it to the ground comprising, in turn, granular material or material with rheological behaviour and having a seismic impedance ranging between $2 \times 10^5$ and $4 \times 10^6$ kg/m$^2$s.

In FIG. 2 a further preferred embodiment of the seismograph object of the present invention is indicated as a whole with 20. The parts of the seismograph 20 the same as those of the seismograph 1 are indicated with the same numerals and are not described again.

The seismograph 20 differs from the seismograph 1 in that it comprises three nails 21 (only two of which are illustrated in FIG. 2) for coupling the instrument to the ground in place of the pad 12. The number of three nails or screws must be intended as indicative and not limiting.

A further embodiment not illustrated herein provides for the combined use of the nails and the pad.

The portable seismograph object of the present invention, which comprises a bottom portion having a seismic impedance similar to both that of the ground and of the construction materials and has an extremely small weight (from 1 to 2 Kg approx.), follows with no perturbation or distortion thereto, the oscillations of the seismic tremor. With the seismograph of the present invention it is therefore possible to effectively measure the seismic noise and to identify the resonance frequencies of buildings and any resonance frequency of the subsoil between approx. $10^{-1}$ and $10^2$ Hz in any point of the earth's surface, even at a distance of thousands of kilometers from sources of anthropic noise or from the coasts.

As it can obviously be understood, due to its particularly compact mass, the portable seismograph can be used with great practicality and convenience.

The effectiveness of the seismograph forming the object of the present invention is further enhanced by the presence of the pad 12 and/or of the nails 21, which make it possible to solve the problem relevant to the control of resonances of the combined seismograph-soil oscillating system, that potentially interfere with the seismic tremor and perturb the measurement.

In fact, the pad 12 can provide an excellent damping of the vibrations of the aforesaid oscillating system, while the nails 21, by producing a more rigid coupling of the support structure 2 and the ground, raise the resonance frequency of the combined seismograph-soil system to values much higher than those of the seismic measures of interest, thus leaving measurement of the seismic tremor unperturbed even if there is no specific damping element.

As it can obviously be understood, the combined use of the nails and of the pad makes it possible to simultaneously obtain a high level of damping and also to raise the resonance frequency values of the combined seismograph-soil system to values much higher than those of the seismic measures of interest.

Moreover, the seismograph of the present invention makes it possible to obtain a low energy consumption (below 100 mW) thanks to the use of electrodynamic or capacitive transducers and to immediate digitization of the signal emitted from the transducers, delegating to the digital electronics the whole computational and recording process thereof. The low consumption makes it possible to use particularly small batteries, thus limiting the weight of the instrument, a fact which further contributes to minimize the perturbation of the seismic tremor detectable by the sensors. In fact, the very presence of the instrument perturbs the seismic tremor field and in order to achieve the best measurements the instrument mass must be as close as possible to zero.

A further advantage of the seismograph of the present invention derives from the fact that it has no external cables, neither for power nor for data transmission purposes, which, as it is well known to those skilled in the art, can generate in the spectrum of the tremor a series of spurious peaks that are almost impossible to isolate or subsequently remove.

Finally, the support and containment structure 2 can have an external surface with a mirror and/or metallized finish and/or coloured with reflecting shades, to avoid heating its internal components by irradiation, which would be detrimental to its measuring efficiency.

The invention claimed is:

1. A portable seismograph comprising:
   a support and containment structure comprising at least a bottom portion made of a material having a seismic impedance value ranging between $2 \times 10^5$ and $4 \times 10^6$ kg/($m^2$s), said containment structure defining an opened side configured to receive said bottom portion;
   at least three sensors placed orthogonally to one another, each comprising at least one electrodynamic or capacitive transducer, said sensors being attachable to said bottom portion;
   a level to position the containment structure horizontally, said level being exposed through a side of said containment structure opposite said opened side;
   a control unit connected to said sensors and designed to record, to manage acquisition mode and to process data, said control unit further comprising a signal amplification digitization and filtering system, a mass memory, external controls to adjust acquisition, a display, and a microprocessor;
   a GPS receiver adjacent to said side of said containment structure opposite said opened side;
   an external surface comprising a mirror, or metalized finish;
   an independent internal power source; and
   means for coupling to the ground designed not to perturb the seismic noise detectable by the sensors;
   wherein said means for coupling to the ground further comprising nail or screw elements protruding from said bottom portion of said support and containment structure, and a pad made of granular material or with rheological behavior and having a seismic impedance ranging between $2 \times 10^5$ and $4 \times 10^6$ kg/($m^2$s), said nail or screw elements provide a rigid coupling of said support and containment structure and the ground, and to raise the resonance frequency of said portable seismograph, said pad dampens vibrations of said portable seismograph that interfere with seismic tremors and perturb the measurement thereof from said portable seismograph;
   wherein a portion of said control unit being exposed through said side of said containment structure opposite said opened side.

2. A portable seismograph comprising:
   a support and containment structure comprising at least a bottom portion and an external surface, said bottom portion being made of a material having a seismic impedance value ranging between $2 \times 10^5$ and $4 \times 10^6$ kg/($m^2$s), said external surface comprising a mirror, or metalized finish, said external surface avoids heating said portable seismograph;
   at least three sensors placed orthogonally to one another, each comprising at least one electrodynamic or capacitive transducer, said sensors being attachable to said bottom portion;
   a level to position the containment structure horizontally;
   a control unit connected to said sensors and designed to record, to manage acquisition mode and to process data, said control unit comprising a signal amplification digitization and filtering system, a mass memory, external controls to adjust acquisition, a display, and a microprocessor;
   an independent internal power source;
   at least one nail or screw element protruding from said bottom portion of said support and containment structure, said nail or screw element provides a rigid coupling of said support and containment structure and the ground, and to raise the resonance frequency of said portable seismograph;
   a pad attachable to said bottom portion of said support and containment structure, said pad comprising at least a deformable layer made of granular material or with rheological behavior and having a seismic impedance ranging between $2 \times 10^5$ and $4 \times 10^6$ kg/(m²s); and a GPS receiver;

wherein said containment structure defining an opened side configured to receive said bottom portion;

wherein a portion of said control unit being exposed through a side of said external surface of said containment structure opposite said opened side;

wherein said GPS receiver is adjacent to said side of said external surface of said containment structure opposite said opened side;

wherein said level being located on and said side of said external surface of said containment structure opposite said opened side.

* * * * *